US011124978B2

(12) United States Patent
Houston

(10) Patent No.: US 11,124,978 B2
(45) Date of Patent: Sep. 21, 2021

(54) STRUT FOR A MULTI-STORY BUILDING

(71) Applicant: BIG TIME INVESTMENT, LLC, Southfield, MI (US)

(72) Inventor: Stephen T. Houston, Lake Orion, MI (US)

(73) Assignee: BIG TIME INVESTMENT, LLC, Southfield, MI (US)

( * ) Notice: Subject to any disclaimer, the term of this patent is extended or adjusted under 35 U.S.C. 154(b) by 282 days.

(21) Appl. No.: 16/359,106

(22) Filed: Mar. 20, 2019

(65) Prior Publication Data

US 2020/0299983 A1    Sep. 24, 2020

(51) Int. Cl.
*E04G 25/06* (2006.01)
*G01P 15/02* (2013.01)
*G01P 1/00* (2006.01)

(52) U.S. Cl.
CPC ............ *E04G 25/065* (2013.01); *G01P 1/003* (2013.01); *G01P 15/02* (2013.01)

(58) Field of Classification Search
CPC combination set(s) only.
See application file for complete search history.

(56) References Cited

U.S. PATENT DOCUMENTS

| | | | |
|---|---|---|---|
| 3,283,465 A | 11/1966 | Cheskin | |
| 3,966,164 A * | 6/1976 | Dashew | E04G 11/48 249/18 |
| 4,071,988 A | 2/1978 | Bowes | |
| 4,122,645 A * | 10/1978 | Tooley | E04G 11/486 52/651.1 |
| 5,992,582 A | 11/1999 | Lou et al. | |
| 6,176,463 B1 * | 1/2001 | Rock | E04G 11/48 249/18 |
| 6,394,405 B1 * | 5/2002 | Roxton | E04G 25/04 248/354.1 |
| 8,919,727 B2 * | 12/2014 | Khoo | E04G 11/48 249/18 |

(Continued)

FOREIGN PATENT DOCUMENTS

| FR | 2823521 A1 * | 10/2002 | ........... E04G 25/061 |
|---|---|---|---|
| FR | 2823521 A1 | 10/2002 | |

(Continued)

OTHER PUBLICATIONS

International search report for international application No. PCT/US20/22640.

*Primary Examiner* — Monica E Millner

(57) ABSTRACT

A strut may be interposed between a first floor plate and a second floor plate of a multi-story building, wherein the first floor plate is disposed overtop of the second floor plate. The strut includes a first post section and a second post section. The first post section includes a first portion that is coaxial with, annular to and slidably disposed within a second portion of the second post section. A damping actuator is interposed between the first post section and the second post section, and is arranged to dynamically control a position of the first post section in relation to the second post section. The strut also includes an accelerometer. A controller is in communication with the accelerometer and the damping actuator, and controls the damping actuator to control the position of the first post section in relation to the second post section.

21 Claims, 2 Drawing Sheets

(56) References Cited

U.S. PATENT DOCUMENTS

| | | | |
|---|---|---|---|
| 9,534,406 B2* | 1/2017 | Nielsen | E04G 25/04 |
| 2003/0089050 A1* | 5/2003 | Tipping | E04G 25/06 |
| | | | 52/127.2 |
| 2004/0195062 A1 | 10/2004 | Anderfaas et al. | |
| 2005/0278074 A1 | 12/2005 | Junk et al. | |
| 2009/0113843 A1 | 5/2009 | Levit et al. | |
| 2016/0097210 A1* | 4/2016 | Nielsen | E04G 25/061 |
| | | | 248/354.3 |

FOREIGN PATENT DOCUMENTS

| | | | |
|---|---|---|---|
| FR | 3028281 A1 | 5/2016 | |
| WO | 9623943 A1 | 8/1996 | |
| WO | 2019025394 A1 | 2/2019 | |

* cited by examiner

STRUT FOR A MULTI-STORY BUILDING

TECHNICAL FIELD

The disclosure generally relates to building construction, and a damping strut associated therewith.

BACKGROUND

Many methods of constructing multi-story buildings exist. Traditionally, multi-story buildings have been constructed from the ground up, in which construction of the building begins on a ground level by attaching higher elevation structural elements on top of previously assembled lower structural elements to construct the building in upward direction, i.e., from bottom up. This construction method requires that the structural elements be lifted by a crane and connected in situ at elevation. This is particularly timely and costly when constructing tall buildings.

A more recent construction method includes constructing a vertical support core of the building. The vertical support core is designed to carry all structural loads of the building. Floor plates, including the roof structure surrounding a vertical support core, are constructed around the base of the vertical support core at ground level, lifted vertically into place with strand jacks located on top of the vertical support core, and then connected to the vertical support core. In this matter, the roof structure surrounding the vertical support core is assembled at ground level, lifted to its final elevation, and then attached to the vertical support core. After the roof structure is attached to the vertical support core, the top floor plate is assembled at ground level, lifted to its final elevation, and then attached to the vertical support core. Subsequent floor plates are assembled and attached to the vertical support core in the same manner in a descending order. By so doing, the roof and the floor plates of the building are constructed in a downward direction, i.e., from top down.

All buildings, including those fabricated in a manner described herein, may be subjected to internal and external forces that may induce vertical movement and flexure of one or more of the floor plates. Examples of internal forces include placement of desks, equipment, walls, etc., the movement of people, and the operation of devices such as HVAC units, plumbing facilities, elevators, etc. Examples of external forces include wind loads, seismic motion, etc. Such movement has conventionally been dealt with by enhancing structural stiffness by increasing the sectional profile of structural framing members and by adding structural elements such as diagonal bracing and shear walls. Furthermore, control systems have been added to tall, high-rise structures to enhance their energy-damping capability. Such systems include: passive systems including base isolation; active control systems including metallic yield, friction, viscoelastic connectors, viscous fluid dampers, tuned mass dampers and tuned liquid dampers; and semi-active control systems, including friction control, fluid viscous dampers and tuned mass dampers.

There is a need to provide damping between floor plates, including damping between floor plates that are assembled to a vertical support core of the building, including cantilevered portions of the floor plates that extend from the vertical support core.

There is a need to continuously detect and adapt to changes in vertical loads that may be applied to a building structure by wind, seismic movement, and a wide range of dynamic loads caused by external vibration sources such as heavy vehicle movement, or from internal sources such as movement of occupants or heavy equipment.

SUMMARY

A strut is described, wherein the strut may be interposed between a first floor plate and a second floor plate of a multi-story building, wherein the first floor plate is disposed overtop of the second floor plate. The strut includes a first post section and a second post section. The first post section includes a first portion that is coaxial with, annular to and slidably disposed within a second portion of the second post section. A damping actuator is interposed between the first post section and the second post section, and is arranged to dynamically control a position of the first post section in relation to the second post section. The strut also includes an accelerometer. A controller is in communication with the accelerometer and the damping actuator, and controls the damping actuator to control the position of the first post section in relation to the second post section.

An aspect of the disclosure includes a first floor plate coupled to the first post section and attached to the first floor plate, and a second floor plate including a second post adjustment portion coupled to the second post section and attached to the second floor plate.

Another aspect of the disclosure includes the first post section having a tubular cross-section that is annular to the second post section.

Another aspect of the disclosure includes the damping actuator being arranged to dynamically control the position of the first post section in relation to the second post section, including the damping actuator being arranged to damp movement of the first post section in relation to the second post section.

Another aspect of the disclosure includes the damping actuator being arranged to dynamically control the position of the first post section in relation to the second post section, including the damping actuator being arranged to damp linear displacement of the first post section in relation to the second post section.

Another aspect of the disclosure includes the controller controlling the damping actuator to damp axial movement of the first post section in relation to the second post section.

Another aspect of the disclosure includes the damping actuator being a magneto-rheological device, an electro-rheological device, an electromagnetic device, an electro-hydraulic device, or an electro-pneumatic device.

Another aspect of the disclosure includes electric power being routed to the damping actuator through an interior portion of one of the first post section or the second post section.

Another aspect of the disclosure includes the damping actuator being a serviceable device.

Another aspect of the disclosure includes a controller including a short-range wireless communication device including a transceiver operable to communicate with a second controller.

Another aspect of the disclosure includes the strut being vertically-oriented between the first floor plate and the second floor plate.

Another aspect of the disclosure includes the motion sensor being one of an accelerometer, a strain gage, a displacement sensor, or a geophone.

Another aspect of the disclosure includes a multi-story building including a vertical support core, a first floor plate and a second floor plate assembled onto the vertical support core, wherein the first floor plate is disposed overtop the second floor plate, wherein the first and second floor plates are assembled onto the vertical support core in a cantilevered arrangement. A plurality of vertically-oriented damping struts are interposed between the first floor plate and the second floor plate and attached thereto. Each of the struts includes a first post section and a second post section, a damping actuator, a motion sensor and a post controller. The first post section is slidably disposed in relation to the second post section, and the post controller controls the damping actuator to dynamically control linear displacement the first post section in relation to the second post section. The post controller is in communication with the motion sensor and the damping actuator and in communication with a building controller. The building controller includes a memory device storing an instruction set that is executable to monitor a load being exerted upon the building and individually control operation of the plurality of damping struts based upon the load being exerted upon the building.

A plurality of vertically-oriented damping struts are interposed between the first floor plate and the second floor plate and attached thereto.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

One or more embodiments will now be described, by way of example, with reference to the accompanying drawings, in which.

Figure 1:
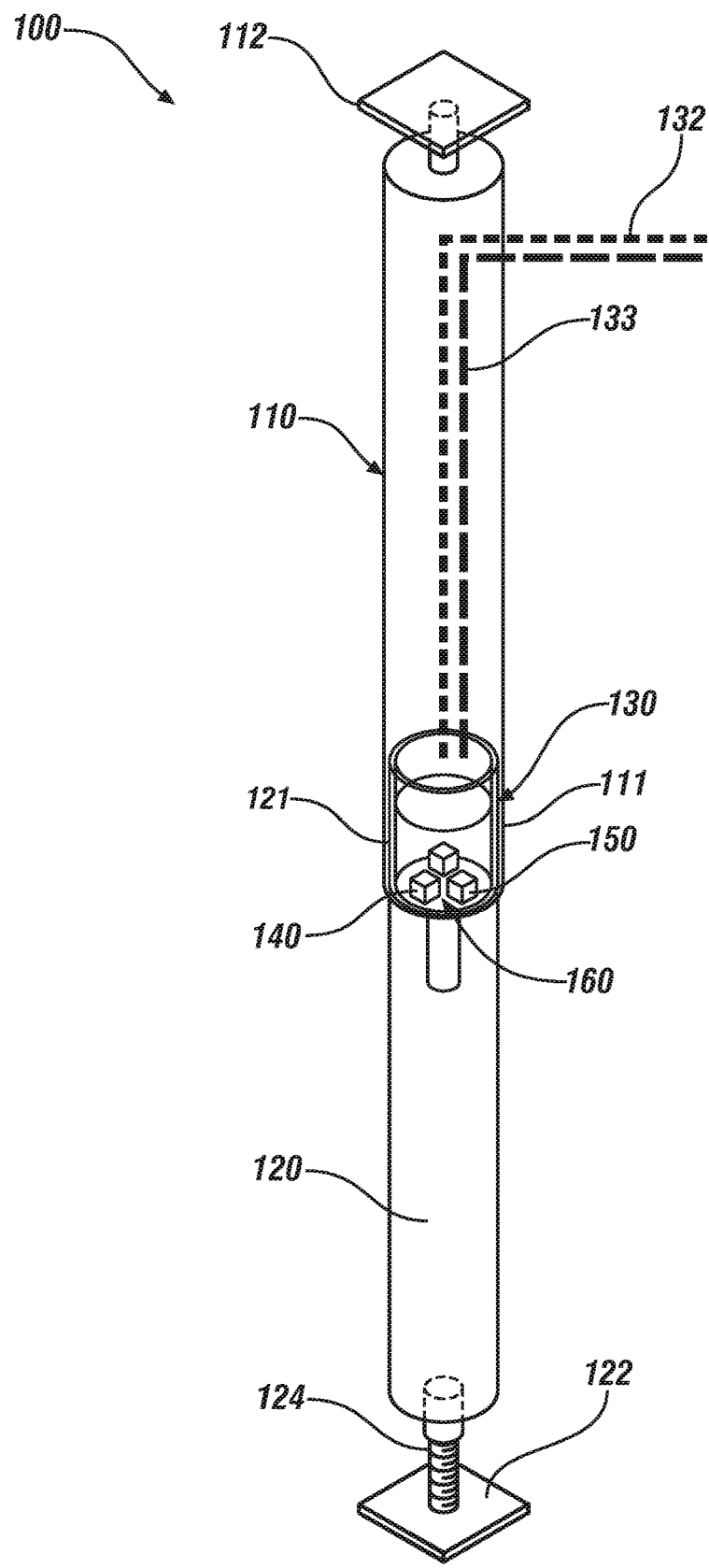
FIG. 1 is a schematic perspective view of a strut, in accordance with the disclosure.

It should be understood that the appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, over, above, below, beneath, rear, and front, may be used with respect to the drawings. These and similar directional terms are merely descriptive, and are not to be construed to limit the scope of the disclosure. Furthermore, the disclosure, as illustrated and described herein, may be practiced in the absence of an element that is not specifically disclosed herein.

Referring to the drawings, wherein like reference numerals correspond to like or similar components throughout the several Figures, a strut 100 is illustrated with reference to FIG. 1, wherein the strut 100 may be disposed in a multistory building 200 as illustrated with reference to FIG. 2 to accomplish the purposes of this disclosure. FIG. 2 is a schematic perspective view of a building 200 that is partially constructed, wherein the building 200 includes a pair of vertical support cores 210 that are disposed on a ground level 205. The building 200 includes a plurality of horizontally arranged floor plates, including, e.g., a roof structure 212, a top floor plate 214, a first intermediate floor plate 216, and a second intermediate floor plate 218. As shown with reference to FIG. 2, the strut 100 may be interposed between adjacent floor plates, e.g., the top floor plate 214 and the first intermediate floor plate 216, wherein the top floor plate 214 is disposed overtop of the first intermediate floor plate 216.

FIG. 2 is a schematic perspective view of a building 200 that is partially constructed, wherein the building 200 includes a pair of vertical support cores 210 that are disposed on a ground level 205. The building 200 includes a roof structure 212, a top floor plate 214, a first intermediate floor plate 216, and a second intermediate floor plate 218. The building 200 as shown is fabricated such that the vertical support cores 210 are designed to carry all structural loads of the building 200. Each of the roof structure 212, the top floor plate 214, the first intermediate floor plate 216, the second intermediate floor plate 218 and any other floor plates (not shown) are assembled at ground level, lifted to its final elevation, and then attached to the vertical support cores 210, in a top-down construction process. As such, each of the aforementioned roof structure 212 and floor plate 214, 216 and 218 is disposed in a cantilevered arrangement. Each of the roof structure 212 and floor plates 214, 216 and 218 may include all structural or frame members, e.g., joists and/or purlins, flooring, e.g., concrete floor, interior walls, exterior curtain walls, modular room subassemblies, e.g., a lavatory module, utilities, etc., that form a floor or level of the building 200.

Figure 2:
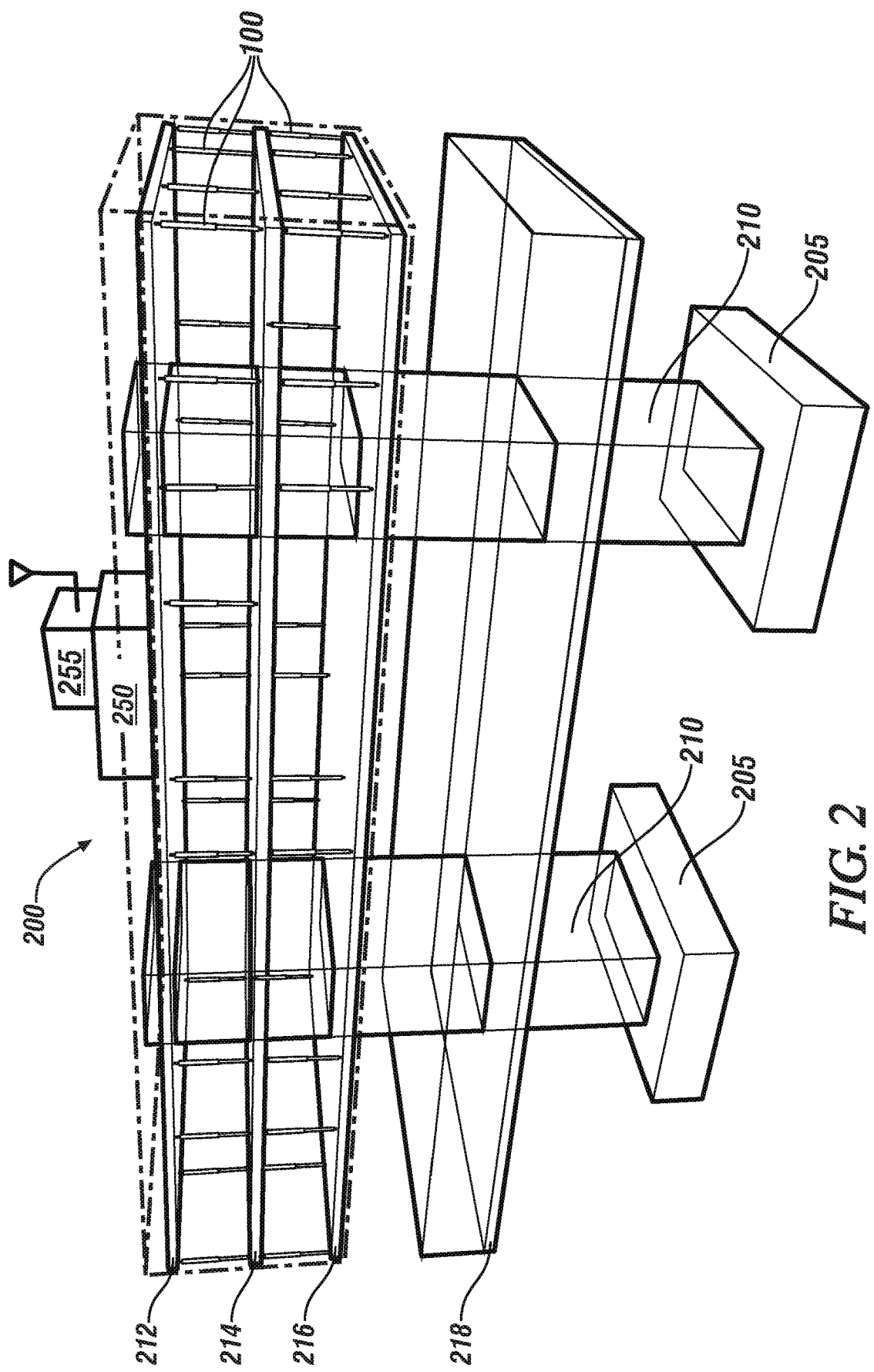
FIG. 2 is a schematic perspective view of a partially constructed building showing a plurality of struts.

Referring now to FIG. 1 and with continued reference to FIG. 2, the strut 100, as described herein, is an elongated vertical support device that may be interposed in a vertical position between floor plates of a building, e.g., interposed between first and second floor plates, such as the top floor plate 214 and the first intermediate floor plate 216. The strut 100 is configured as an independent, intelligent, serviceable device that has a range of microprocessor-controlled movement-damping responses capable of automated reaction to loads imposed on the building 200 for the purposes of minimizing unwanted floor plate vibrations, minimizing floor plate deflections and movements caused by short-period load reactions, and withstanding of seismic loads in conjunction with other systems.

The strut 100 includes a first post section 110, a second post section 120, a first floor base 112, a second floor base 122 including a second post adjustment portion 124, and a damping actuator 140. The first floor base 112 is coupled to the first post section 110 and configured to be attached to a bottom portion of the first horizontal floor plate of the building 200, e.g., the top floor plate 214. The second floor base 122 includes a second post adjustment portion 124 that is coupled to the second post section 120 and is attached to the second horizontal floor plate of the building 200, e.g., the first intermediate floor plate 216. The first post section 110 may be arranged as an elongated tubular device that includes a first portion 111 that is coaxial with, annular to and slidably disposed about a second portion 121 of the second post section 120, which is also an elongated tubular device in one embodiment. The first post section 110 and the second post section 120 may have cross-sectional shapes that are circular, square, rectangular, elliptical, L-shaped, or another shape.

An active damping element 130 is advantageously interposed between the first post section 110 and the second post section 120, and includes the damping actuator 140, a motion sensor 150, and a post controller 160. The post controller 160 may communicate to a building controller 250. Electric power is supplied to the active damping element 130 via an electrical conduit 132 that may be routed from a power distribution panel (not shown) through an interior portion of one of the first post section 110 or the second post section 120. The active damping element 130 may be serviceable, i.e., may be configured to be accessed, serviced or repaired in place, removed and/or replaced. This includes incorporating access panels, detachable electrical connectors, reusable mounting fasteners, etc. into the design thereof.

The damping actuator 140 is a controllable damping device that is arranged to dynamically control an axial position of the first post section 110 in relation to an axial position of the second post section 120, and thus control linear displacement of the first post section 110 in relation to the second post section 120. The damping actuator 140 is a damping mechanism that allows controlled movement of the first post section 110 in relation to an axial position of the second post section 120 of the strut 100 over a limited range, and can be dynamically adjusted to achieve movement resistance, including fixed, i.e., no relative movement, and varying degrees of damping force. This includes controllably restraining motion of the first post section 110 in relation to the second post section 120 in a manner that effects damping. The damping actuator 140 may be a magneto-rheological device, an electro-rheological device, an electromagnetic device, an electro-hydraulic device, or an electro-pneumatic device, by way of non-limiting examples.

The motion sensor 150 is arranged to monitor motion of the elements of the strut 100, and may be an accelerometer, a strain gage, a displacement sensor, a geophone, or another sensing device capable of monitoring motion. In one embodiment, the motion sensor 150 is arranged as a microelectromechanical-based (MEMS) sensor that may disposed on the damping actuator 140.

The motion sensor 150, in conjunction with the post controller 160, is operable to detect amplitude and frequency of loads that are applied to the building 200 as they affect the respective floor plates to which the strut 100 is connected. The loads may be randomly applied loads and/or cyclically repeated applied loads. Examples of external loads include wind, seismic, externally generated vibration from passing vehicles or other sources, etc. Examples of internal loads include occupant movement, equipment transport, vibrations from rotating equipment, vibrations from elevators, etc.

The post controller 160 is in communication with the motion sensor 150 and the damping actuator 140. The post controller 160 may also include a location identifier, which is included in any communication with the building controller 250. The post controller 160 controls the damping actuator 140 in response to a signal input from the motion sensor 150 to control and thus damp linear displacement of the first post section 110 in relation to the longitudinal position of the second post section 120. In one embodiment, the damping actuator 140 is controlled to control and thus damp linear displacement of the first post section 110 in relation to the longitudinal position of the second post section 120 to achieve a critically damped response in response to input from the motion sensor 150. Alternatively, the post controller 160 may instead control the damping actuator 140 in response to an input command from the building controller 250 to control and thus damp linear displacement of the first post section 110 in relation to the longitudinal position of the second post section 120. In one embodiment, the post controller 160 includes a short-range wireless communication device including a transceiver operable to communicate with a second controller, such as the building controller 250. Alternatively or in addition, communication may be effected via a wired communication conduit 133 or a short-range wireless connection, e.g., Bluetooth.

The term "controller" and related terms such as control module, module, control, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. As used herein, the terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine.

Wireless signals from satellites or GNSS sources may be used. One or more terrestrial sources, such as cellular base stations, Wide Area Network Wireless Access Points (WAN-WAPs), wide area wireless network (WWAN), WiMAX (e.g., 802.16), etc. may be used for wireless voice and/or data communication, and as another source of activity and position information. One or more other wireless signal sources such as Local Area Network Wireless Access Points (LAN-WAPs), WLAN, Wi-Fi networks (802.11x), cells, Bluetooth Networks, etc. which may be used for wireless voice and/or data communication, as well as yet another source for activity and positioning data.

A Wireless Local Area Network (WLAN) transceiver, router or base station 255 may be connected to the building controller 250 for communicating with and/or detecting signals to/from strut(s) 100. The wireless base station 255 may include a wireless transceiver for accessing wireless packet data channels and/or a network interface for coupling to an Internet Protocol (IP) based network. The network interface preferably includes a conventional short range wireless transceiver, such as a Bluetooth transceiver, a Home RF transceiver, a wireless IP 801.11 transceiver, and/or ETSI HyperLANx transceiver for coupling to network, such as a WLAN. The network interface can include a wired transceiver, such as a Fast Ethernet transceiver, or a modem, for interconnecting with a wired Local Area Network (LAN). The network may also be connected to the one or more antennas for receiving satellite or radio frequency signals. Wireless base station 255 may provide connectivity to one or more remotely located third party servers.

A plurality of the struts 100 described with reference to FIG. 1 are assembled thereon, and are attached to the respective floor plates near an outer periphery thereof. Each of the struts 100 is arranged to be in communication via a communication network to the building controller 250, wherein the communication may be accomplished via electrical conduits or wirelessly.

The main building structure, i.e., the vertical support cores 210 are designed to carry all structural loads of the building 200, but movement due to high winds, seismic events and vibrations caused by rotating equipment like fans and pumps can be disconcerting or annoying to occupants. The building controller 250 is able to monitor external loads and internal loads as applied to portions of the building 200 employing signal inputs from the plurality of motion sensors 150 disposed on the plurality of struts 100. The building controller 250 monitors inputs from all of the struts 100, including inputs from all of the motion sensors 150, and commands operations to control the damping actuators 140 of all of the struts 100, including, in one embodiment controlling the damping actuators 140 of all of the struts 100 to achieve a critically damped response.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A non-structural-load-bearing strut interposed between a cantilevered first floor plate and a second floor plate of a multi-story building, wherein the first floor plate is disposed overtop of the second floor plate, comprising:
    a first post section and a second post section, the first post section including a first portion that is slidably disposed within a second portion of the second post section;
    a damping actuator interposed between the first post section and the second post section, the damping actuator arranged to dynamically control a position of the first post section in relation to the second post section;
    a motion sensor, wherein the motion sensor is arranged to monitor motion of the first post section in relation to the second post section to detect an amplitude and a frequency of a load that is applied to the multi-story building; and
    a controller, in communication with the motion sensor and the damping actuator, wherein the controller controls the damping actuator to control the position of the first post section in relation to the second post section based upon the amplitude and the frequency of the load that is applied to the multi-story building that are monitored by the motion sensor.

2. The strut of claim 1, further comprising:
    a first floor base coupled to the first post section and attached to the first floor plate; and
    a second floor base including a second post adjustment portion coupled to the second post section and attached to the second floor plate.

3. The strut of claim 1, wherein the first post section has a tubular cross-section that is annular to the second post section.

4. The strut of claim 1, wherein the damping actuator being arranged to dynamically control the position of the first post section in relation to the second post section comprises the damping actuator being arranged to damp movement of the first post section in relation to the second post section, wherein the damping actuator is controlled to achieve a critically damped response.

5. The strut of claim 1, wherein the damping actuator being arranged to dynamically control the position of the first post section in relation to the second post section comprises the damping actuator being arranged to damp linear displacement of the first post section in relation to the second post section.

6. The strut of claim 1, wherein the controller controls the damping actuator to damp axial movement of the first post section in relation to the second post section.

7. The strut of claim 1, further comprising the first post section including the first portion that is coaxial with, annular to and slidably disposed within the second portion of the second post section.

8. The strut of claim 1, wherein the damping actuator comprises a magneto-rheological device.

9. The strut of claim 1, wherein the damping actuator comprises an electro-rheological device.

10. The strut of claim 1, wherein the damping actuator comprises an electromagnetic device.

11. The strut of claim 1, wherein the damping actuator comprises an electro-hydraulic device.

12. The strut of claim 1, wherein the damping actuator comprises an electro-pneumatic device.

13. The strut of claim 1, wherein electric power is routed to the damping actuator through an interior portion of one of the first post section or the second post section.

14. The strut of claim 1, wherein the damping actuator comprises a serviceable device.

15. The strut of claim 1, wherein the controller includes a short-range wireless communication device including a transceiver operable to communicate with a second controller.

16. The strut of claim 1, wherein the strut is vertically oriented between the first floor plate and the second floor plate.

17. The strut of claim 1, wherein the motion sensor comprises an accelerometer.

18. The strut of claim 1, wherein the motion sensor comprises one of a strain gage, a displacement sensor, or a geophone.

19. A vertically-oriented damping strut interposed between a first floor plate and a second floor plate of a multi-story building wherein the first and second floor plates are assembled to a vertical support core and are disposed in cantilevered arrangements the strut including:
- a first post section including a first floor base that is coupled to the first floor plate;
- a second post section including a second post adjustment portion and a second floor base that is coupled to the second floor plate;
- a damping actuator, interposed between the first post section and the second post section, and arranged to control a position of the first post section in relation to the second post section and to damp axial movement of first and second post sections;
- an accelerometer; and
- a first controller, in communication with the accelerometer and the damping actuator, wherein the controller controls the actuator to control the position and movement of the first post section in relation to the second post section;
- wherein the first controller includes a wireless short-range communication system arranged to communicate with a second controller.

20. A multi-story building, comprising:
a vertical support core;
a first floor plate and a second floor plate assembled onto the vertical support core, wherein the first floor plate is disposed overtop the second floor plate, and wherein the first and second floor plates are assembled onto the vertical support core in a cantilevered arrangement; and
a plurality of vertically-oriented damping struts, wherein each of the damping struts is interposed between the first floor plate and the second floor plate and attached thereto;
wherein each of the struts includes a first post section and a second post section, a damping actuator, a motion sensor and a post controller, wherein the first post section is slidably disposed in relation to the second post section, wherein the post controller controls the damping actuator to dynamically control linear displacement the first post section in relation to the second post section, wherein the post controller is in communication with the motion sensor and the damping actuator, and wherein the post controller is in communication with a building controller;
wherein the building controller includes a memory device storing an instruction set, wherein the instruction set is executable to:
monitor a load being exerted upon the building; and
individually control operation of the plurality of damping struts based upon the load being exerted upon the building.

21. The multi-story building of claim 20, wherein the vertically-oriented damping struts are interposed between the first floor plate and the second floor plate and attached thereto near an outer periphery of the first floor plate.

\* \* \* \* \*